US012659955B2

(12) United States Patent
Yoon et al.

(10) Patent No.: US 12,659,955 B2
(45) Date of Patent: Jun. 16, 2026

(54) DEVICE FOR TRANSMITTING DATA USING SIDELINK IN WIRELESS COMMUNICATION SYSTEM AND OPERATION METHOD THEREOF

(71) Applicant: SAMSUNG ELECTRONICS CO., LTD., Suwon-si (KR)

(72) Inventors: Hongsik Yoon, Seoul (KR); Jungmin Park, Seoul (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 654 days.

(21) Appl. No.: 17/953,846

(22) Filed: Sep. 27, 2022

(65) Prior Publication Data

US 2023/0117782 A1      Apr. 20, 2023

(30) Foreign Application Priority Data

Oct. 19, 2021      (KR) ......................... 10-2021-0139741
May 17, 2022      (KR) ......................... 10-2022-0060428

(51) Int. Cl.
*H04W 72/20*      (2023.01)

(52) U.S. Cl.
CPC .................................... *H04W 72/20* (2023.01)

(58) Field of Classification Search
CPC .............. H04W 72/20; H04W 72/046; H04W 72/0446; H04W 72/0453; H04W 72/25; H04W 72/40
See application file for complete search history.

(56) References Cited

U.S. PATENT DOCUMENTS

2020/0267734 A1      8/2020   Khoshnevisan et al.
2020/0413348 A1      12/2020   Ryu et al.
(Continued)

FOREIGN PATENT DOCUMENTS

KR      10-2021-0125586 A      10/2021
WO      2020/063611 A1      4/2020
WO      2020/213986 A1      10/2020

OTHER PUBLICATIONS

S.-Y. Lien et al., "3GPP NR Sidelink Transmissions Toward 5G V2X," in IEEE Access, vol. 8, pp. 35368-35382, 2020, doi: 10.1109/ACCESS.2020.2973706. (https://ieeexplore.ieee.org/document/8998153) (Year: 2020).*

(Continued)

*Primary Examiner* — Nicholas A Jensen
*Assistant Examiner* — Ayodele Lawrence Olubodun
(74) *Attorney, Agent, or Firm* — Sughrue Mion, PLLC

(57) ABSTRACT

The present disclosure provides methods and apparatuses for performing sidelink-based vehicle to everything (V2X) communication. In some embodiments, an operation method includes receiving, by the second device from the first device during a first symbol period, a physical sidelink control channel (PSCCH) and a first physical sidelink shared channel (PSSCH), based on a first transmission configuration indication (TCI) state assigned to the PSCCH. The first symbol period includes first symbols on which the PSCCH and the first PSSCH are received. The operation method further includes receiving, by the second device from the first device during a second symbol period that follows the first symbol period, a second PSSCH, based on a second TCI state. The second symbol period includes second symbols on which the second PSSCH is received.

17 Claims, 17 Drawing Sheets

(56) References Cited

U.S. PATENT DOCUMENTS

| | | | |
|---|---|---|---|
| 2021/0028896 A1 | 1/2021 | Yasukawa et al. | |
| 2021/0120529 A1* | 4/2021 | Park | H04W 72/0446 |
| 2021/0127403 A1 | 4/2021 | Ryu et al. | |
| 2021/0204252 A1 | 7/2021 | Akkarakaran et al. | |
| 2021/0306867 A1 | 9/2021 | Hamdi-Sepehr et al. | |
| 2021/0360603 A1* | 11/2021 | Wang | H04L 5/0048 |
| 2021/0400604 A1* | 12/2021 | Wang | H04L 5/001 |
| 2022/0014332 A1* | 1/2022 | Wang | H04L 5/0007 |
| 2022/0039072 A1* | 2/2022 | Babaei | H04L 5/0053 |
| 2022/0159703 A1 | 5/2022 | Kim et al. | |
| 2023/0066174 A1* | 3/2023 | Xu | H04W 74/0808 |
| 2024/0064739 A1* | 2/2024 | Falkenberg | H04W 72/40 |

OTHER PUBLICATIONS

3GPP NR Sidelink Transmissions Toward 5G V2X (Year: 2020).*
3GPP NR Sidelink Transmisions Toward 5G V2X (Year: 2020).*
"3rd Generation Partnership Project; Technical Specification Group Radio Access Network; Overall description of Radio Access Network (RAN) aspects for Vehicle-to-everything (V2X) based on LTE and NR (Release 16)", 3GPP TR 37.985 V1.4.0, May 2020, (34 pages), XP 051924135.
Communication dated Mar. 1, 2023 by the European Patent Office in corresponding EP Patent Application No. 22202589.2.

\* cited by examiner

FIG. 2C $M_{SCH} = LM_{Sub}$ {

| AGC | PSCCH | DMRS | PSSCH | PSSCH | PSSCH | PSSCH | PSSCH | DMRS | PSSCH | PSSCH | Guard |

FIG. 4

| QCL Type | Channel Properties |
|----------|--------------------|
| Type A | Doppler shift, Doppler spread, average delay, delay spread |
| Type B | Doppler shift, Doppler spread |
| Type C | Doppler shift, average delay |
| Type D | Spatial Rx parameter |

Figure 12:
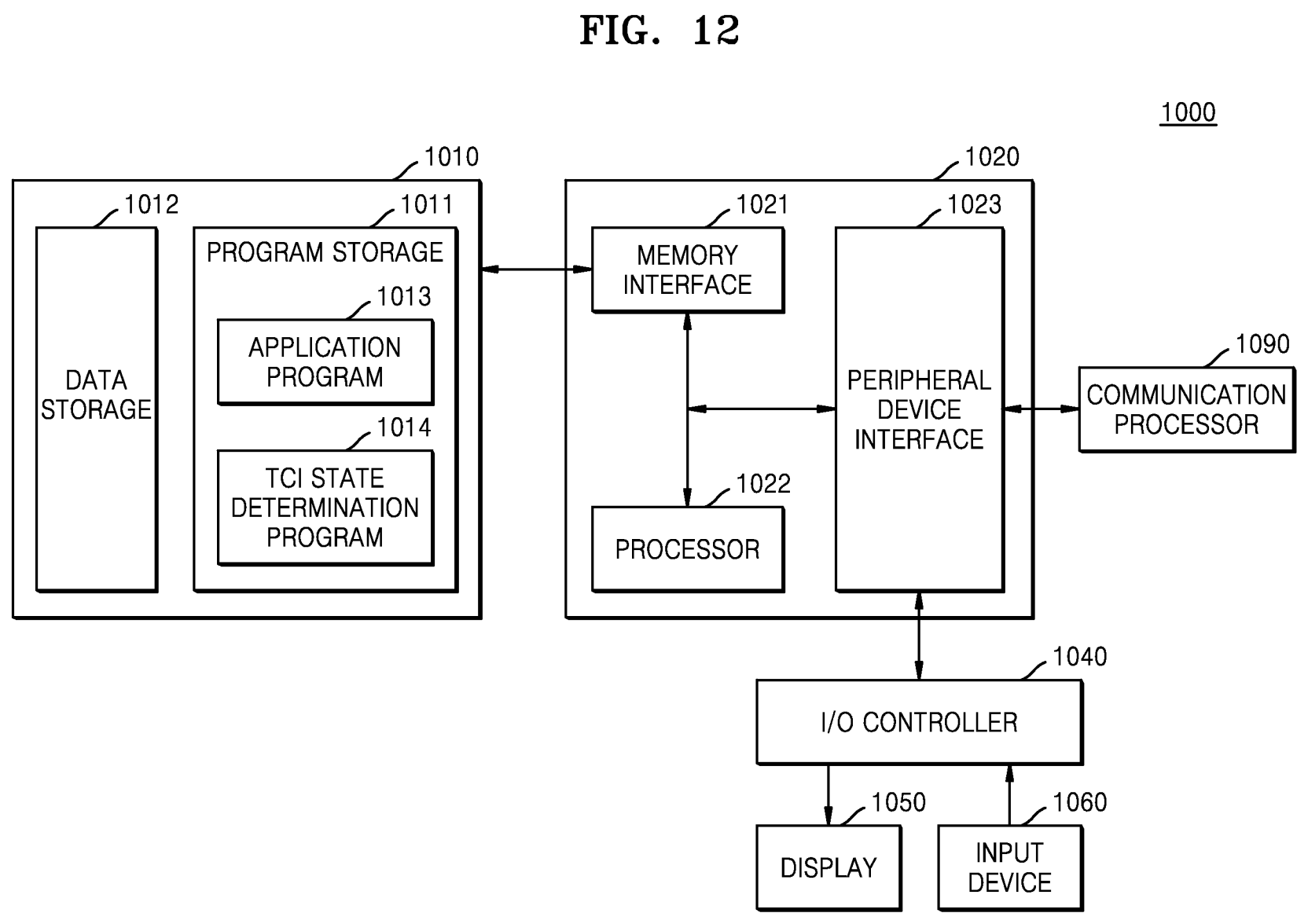

1090 COMMUNICATION PROCESSOR

1020

1023 PERIPHERAL DEVICE INTERFACE

1021 MEMORY INTERFACE

1022 PROCESSOR

1040 I/O CONTROLLER

1060 INPUT DEVICE

1050 DISPLAY

1010 PROGRAM STORAGE

1011

1013 APPLICATION PROGRAM

1014 TCI STATE DETERMINATION PROGRAM

1012 DATA STORAGE

DEVICE FOR TRANSMITTING DATA USING SIDELINK IN WIRELESS COMMUNICATION SYSTEM AND OPERATION METHOD THEREOF

CROSS-REFERENCE TO RELATED APPLICATIONS

This application claims benefit of priority under 35 U.S.C. § 119 to Korean Patent Application No. 10-2021-0139741, filed on Oct. 19, 2021, and to Korean Patent Application No. 10-2022-0060428, filed on May 17, 2022, in the Korean Intellectual Property Office, the disclosures of which are incorporated by reference herein in their entireties.

BACKGROUND

1. Field

The present disclosure relates to a device for transmitting data using a sidelink in a wireless communication system and an operation method of the device, and more particularly, to a device for operating multiple transmission configuration indications (TCIs) in a wireless communication system and an operation method of the device.

2. Description of Related Art

Unlike long-term evolution (LTE) sidelink, a new radio (NR) sidelink defines 2-stage sidelink control information (SCI). The NR sidelink defines use in frequency range 1 (FR 1) as well as in frequency range 2 (FR 2) which includes higher frequency bands than in FR1. Accordingly, on the NR sidelink, a wireless communication system requires a beamforming gain for high data throughput.

A wireless communication device for transmitting SCI in sidelink communication may use at least one of an omni-directional beam and a wide beam so that a plurality of wireless communication devices may commonly decode first SCI and second SCI. However, when the wireless communication device receives data based on an omnidirectional beam or a wide beam in sidelink communication, a decrease in a beamforming gain may occur. Therefore, there is a need for a method of increasing a beamforming gain when a wireless communication device receives data in sidelink communication.

SUMMARY

The present disclosure provides a wireless communication device for operating multiple transmission indications (TCIs) on sidelink and an operation method of the wireless communication device.

According to an aspect of the present disclosure, an operation method of a second device for performing sidelink-based vehicle to everything (V2X) communication with a first device is provided. The operation method includes receiving, by the second device from the first device during a first symbol period, a physical sidelink control channel (PSCCH) and a first physical sidelink shared channel (PSSCH), based on a first transmission configuration indication (TCI) state assigned to the PSCCH. The first symbol period includes first symbols on which the PSCCH and the first PSSCH are received. The operation method further includes receiving, by the second device from the first device during a second symbol period that follows the first symbol period, a second PSSCH, based on a second TCI state. The second symbol period comprising second symbols on which the second PSSCH is received.

In some embodiments, the receiving, during the second symbol period, of the second PSSCH may include obtaining information indicating the second TCI state from at least one of the PSCCH and the first PSSCH received during the first symbol period, and configuring the second device according to the second TCI state based on the information indicating the second TCI state.

In some embodiments, the second TCI state may be different from the first TCI state.

In some embodiments, a first beam formed by the second device according to the first TCI state may be wider than a second beam formed by the second device according to the second TCI state.

In some embodiments, the second TCI state is one of a plurality of TCI states assigned to the PSCCH.

In some embodiments, the receiving, during the second symbol period, of the second PSSCH includes, when the second device does not receive information related to the second TCI state from the first device, configuring the second TCI state to match the first TCI state.

In some embodiments, the receiving, during the second symbol period, of the second PSSCH includes configuring the second TCI state to match the first TCI state when a total length of the first symbol period and the second symbol period is less than or equal to a threshold value, and configuring the second TCI state to match information provided from the first device when the total length of the first symbol period and the second symbol period exceeds the threshold value.

In some embodiments, the PSCCH comprises sidelink control information (SCI) indicating at least one of the first TCI state and the second TCI state.

In some embodiments, the SCI further indicates a starting symbol of the second symbol period, and the first TCI state is different from the second TCI state.

In some embodiments, the SCI comprises information about a last symbol on which the PSCCH is received and information about a number of at least one symbol following the last symbol.

In some embodiments, the first PSSCH received during the first symbol period comprises SCI indicating at least one of the first TCI state and the second TCI state.

According to an aspect of the present disclosure, an operation method of a first device for performing sidelink-based V2X communication with a second device is provided. The operation method includes transmitting, by the first device to the second device during a first symbol period, a PSCCH and a first SSCH, based on a first TCI state assigned to the PSCCH. The first symbol period includes first symbols on which the PSCCH and the first PSSCH are transmitted. The operation method further includes transmitting, by the first device to the second device during a second symbol period that follows the first symbol period, a second PSSCH, based on a second TCI state. The second symbol period includes second symbols on which the second PSSCH is transmitted.

In some embodiments, the second TCI state is different from the first TCI state.

In some embodiments, a first beam formed by the second device according to the first TCI state is wider than a second beam formed by the second device according to the second TCI state.

In some embodiments, the second TCI state is one of a plurality of TCI states assigned to the PSCCH.

In some embodiments, the PSCCH comprises SCI indicating at least one of the first TCI state and the second TCI state.

In some embodiments, the SCI further indicates a starting symbol of the second symbol period, and the first TCI state is different from the second TCI state.

In some embodiments, the SCI comprises information about a last symbol on which the PSCCH is transmitted and information about a number of at least one symbol following the last symbol.

In some embodiments, the first PSSCH comprises SCI indicating at least one of the first TCI state and the second TCI state.

According to an aspect of the present disclosure, a second device for performing sidelink-based V2X communication with a first device is provided. The second device includes a radio frequency integration circuit (RFIC) configured to receive, from the first device during a first symbol period, a PSCCH and a first PSSCH, based on a first TCI state assigned to the PSCCH. The first symbol period includes first symbols on which the PSCCH and the first PSSCH are received. The second device further includes a processor communicatively coupled to the RFIC and configured to determine that the first TCI state assigned to the PSCCH matches a TCI state of the PSSCH in the first symbol period. The RFIC is further configured to receive, from the first device during a second symbol period that follows the first symbol period, a second PSSCH based on a second TCI state. The second symbol period includes symbols on which the second PSSCH is received.

BRIEF DESCRIPTION OF THE DRAWINGS

Embodiments of the present disclosure will be more clearly understood from the following detailed description taken in conjunction with the accompanying drawings in which:

FIGS. 2A through 2D illustrate allocation of a physical sidelink control channel (PSCCH) and a physical sidelink shared channel (PSSCH) in a new radio (NR) sidelink, according to embodiments applicable to the present disclosure;

FIG. 4 illustrates channel properties according to a quasi co-location (QCL) type;

FIG. 12 is a block diagram of an electronic device according to an embodiment.

DETAILED DESCRIPTION

Figure 1:
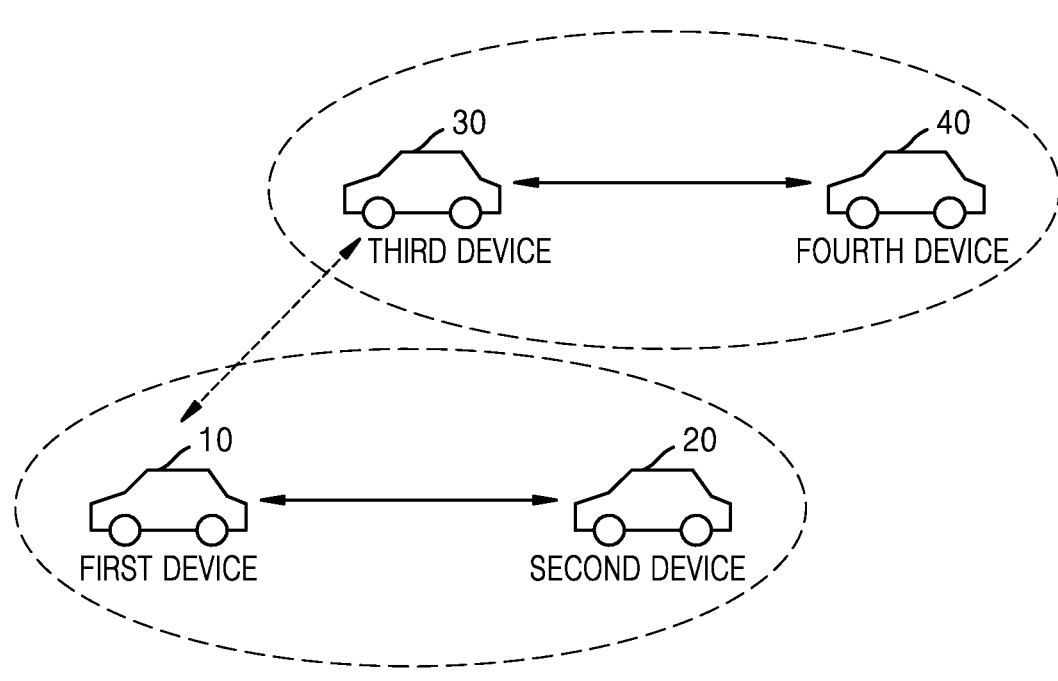
FIG. 1 illustrates sidelink communication according to an embodiment.

The following description with reference to the accompanying drawings is provided to assist in a comprehensive understanding of embodiments of the present disclosure defined by the claims and their equivalents. Various specific details are included to assist in understanding, but these details are considered to be exemplary only. Therefore, those of ordinary skill in the art will recognize that various changes and modifications of the embodiments described herein can be made without departing from the scope and spirit of the disclosure. In addition, descriptions of well-known functions and structures are omitted for clarity and conciseness.

With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wired), wirelessly, or via a third element.

It will be understood that when an element or layer is referred to as being "over," "above," "on," "below," "under," "beneath," "connected to" or "coupled to" another element or layer, it can be directly over, above, on, below, under, beneath, connected or coupled to the other element or layer or intervening elements or layers may be present. In contrast, when an element is referred to as being "directly over," "directly above," "directly on," "directly below," "directly under," "directly beneath," "directly connected to" or "directly coupled to" another element or layer, there are no intervening elements or layers present.

A base station communicates with a wireless communication device, and as an entity that allocates communication network resources to the wireless communication device, the base station may be at least one of a cell, a base station (BS), a NodeB (NB), an eNodeB (eNB), a next generation radio access network (NG-RAN), a radio access unit, a base station controller, a node on a network, a gNodeB (gNB), a transmission and reception point, a transmission point, and a remote radio head (RRH).

A wireless communication device is an entity that communicates with a base station or other wireless communication device, and may be referred to as a node, a user equipment (UE), a next generation UE (NG UE), a mobile station (MS), a mobile equipment (ME), a device, a terminal, or the like.

Furthermore, the wireless communication device may include at least one of a smartphone, a tablet PC, a mobile phone, a video phone, an e-book reader, a desktop PC, a laptop PC, a netbook computer, a personal digital assistant (PDA), a portable multimedia player (PMP), an MP3 player, medical equipment, a camera, and a wearable device. In addition, the wireless communication device may include at least one of a television, a digital video disk (DVD) player, an audio system, a refrigerator, an air conditioner, a vacuum cleaner, an oven, a microwave oven, a washing machine, an air purifier, a set-top box, a home automation control panel, a security control panel, a media box (e.g., Samsung Home-Sync™, Apple TV™, or Google TV™), a game console (e.g., Xbox™, PlayStation™), an electronic dictionary, an electronic key, a camcorder, and an electronic picture frame. In addition, the wireless communication device may include at least one of various medical devices (e.g., various portable medical measuring devices (a blood glucose meter, a heart rate monitor, a blood pressure monitor, or a body temperature monitor), a magnetic resonance angiography (MRA) device, a magnetic resonance imaging (MRI) device, a computed tomography (CT) device, an imaging device, an ultrasound device, or the like), a navigation device, a global navigation satellite system (GNSS)), an event data recorder (EDR), a flight data recorder (FDR), an automotive infotainment device, marine electronic equipment (e.g., a marine navigation device, a gyrocompass, or the like), avionics, a security device, a car head unit, an industrial or household robot, a drone, an automated teller machine (ATM) in a financial institution, a point-of-sale (POS) system in a store, and the Internet-of-things (IoT) devices (e.g., a light bulb, various sensors, a sprinkler system, a fire alarm, a thermostat, street lights, a toaster, workout equipment, a hot water tank, a heater, a boiler, etc.). In addition, the wireless communication device may include various types of multimedia systems capable of performing communication functions.

Hereinafter, embodiments of the present disclosure will be described in detail with reference to the accompanying drawings.

FIG. 1 illustrates sidelink (SL) communication according to an embodiment.

SL communication may refer to vehicle to everything (V2X) communication. On the SL communication, a wireless communication device may transmit and/or receive a signal to and/or from another wireless communication device. In other words, the wireless communication device may be a transmitter device and/or receiver device in SL communication. Hereinafter, for convenience of descriptions, a transmitter device and a receiver device may be respectively referred to as a transmitter UE and a receiver UE.

Referring to FIG. 1, a first device 10 may transmit SL signals to a plurality of UEs. For example, the first device 10 may transmit SL signals to a second device 20 and a third device 30. As a specific example, the first device 10 may simultaneously transmit signals to the second device 20 and the third device 30 by using a wide beam. As another example, the first device 10 may transmit signals to the second device 20 and the third device 30 by using a plurality of beams. The third device 30 may transmit a SL signal to the fourth device 40. The third device 30 may be a receiver UE in relation to the first device 10 and a transmitter UE in relation to the fourth device 40.

The first device 10 may transmit at least one of a physical SL control channel (PSCCH) and a physical SL shared channel (PSSCH) to the second device 20 and the third device 30.

The first device 10 may transmit SL control information (SCI) to a plurality of UEs based on 2-stage SCI. The 2-stage SCI may include first and second SCIs, and the first and second SCIs may include information necessary for SL communication. For example, the first device 10 may transmit the PSCCH including the first SCI to at least one of the second device 20 and the third device 30. The first SCI may include information such as channel sensing, reserved time-frequency resources for transmissions, a demodulation reference signal (DMRS) pattern, a DMRS port, etc. The second device 20 may identify whether another device is using resources based on the received channel sensing information and determine a data transmission timing.

The first device 10 may transmit the second SCI on the PSSCH to at least one of the second device 20 and the third device 30. The second SCI may include control information such as remaining SCI information, remaining scheduling information, target receiver (Rx) UE, etc. The second device 20 and the third device 30 may decode any of first SCI and second SCI. In other words, all receiver UEs may decode any of first SCI and second SCI. When the second device 20 or the third device 30 fails to correctly decode the first SCI, the receiving device (e.g., the second device 20 or the third device 30) may not be able to obtain SCI data such as reserved-resource for retransmission. Therefore, when the second device 20 or the third device 30 fails to correctly decode the first SCI, the second device 20 or the third device 30 as a receiver UE may not be able to perform normal channel sensing, and channel congestion may occur.

The present disclosure proposes a method for preventing or reducing the above-described problem by allowing a wireless communication device to transmit and receive a PSCCH and a PSSCH based on multiple transmission configuration indications (TCIs) in new radio (NR) SL.

FIGS. 2A through 2D illustrate allocation of a PSCCH and a PSSCH in NR SL, according to embodiments applicable to the present disclosure.

Figure 2A:
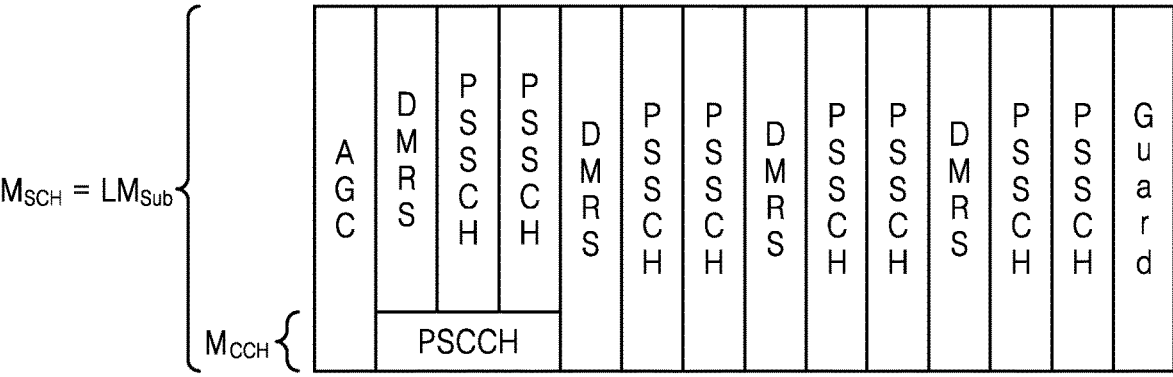
Figure 2B:
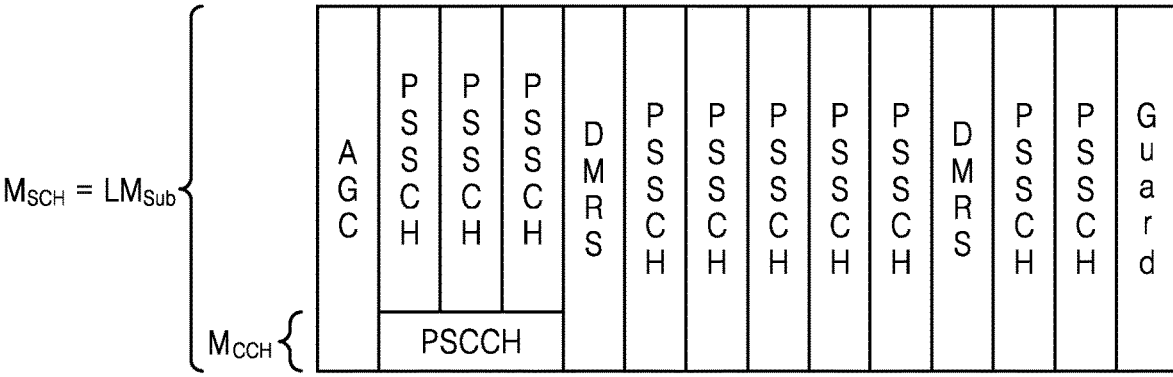
Figure 2C:
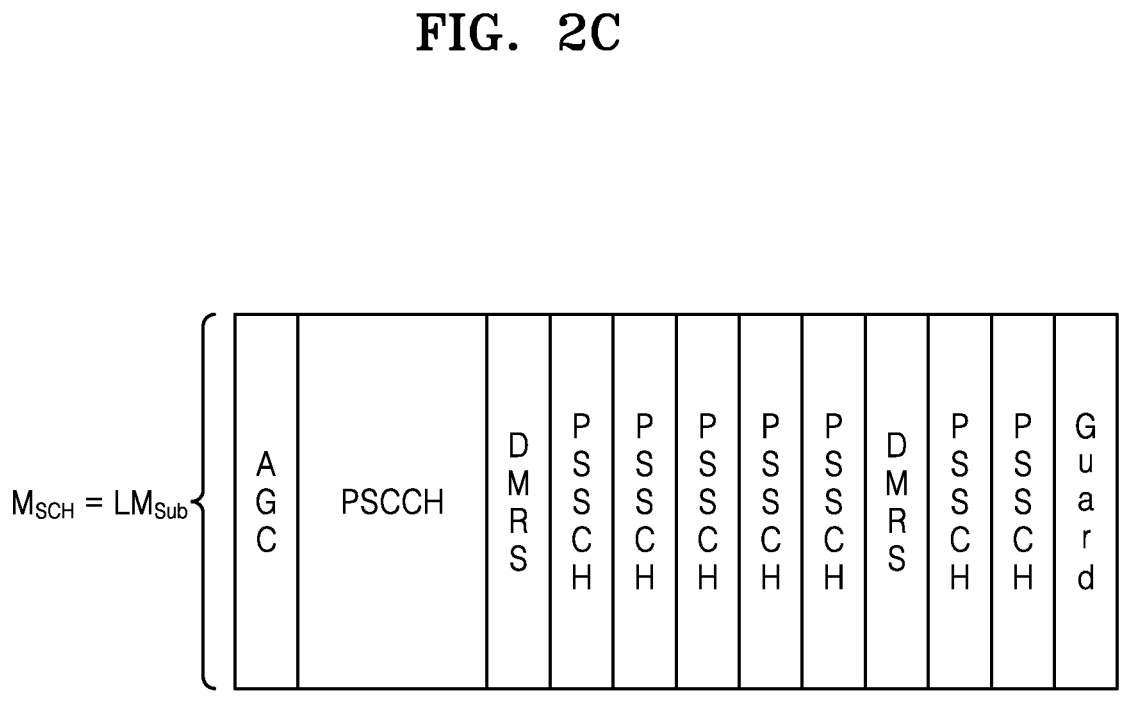
Figure 2D:
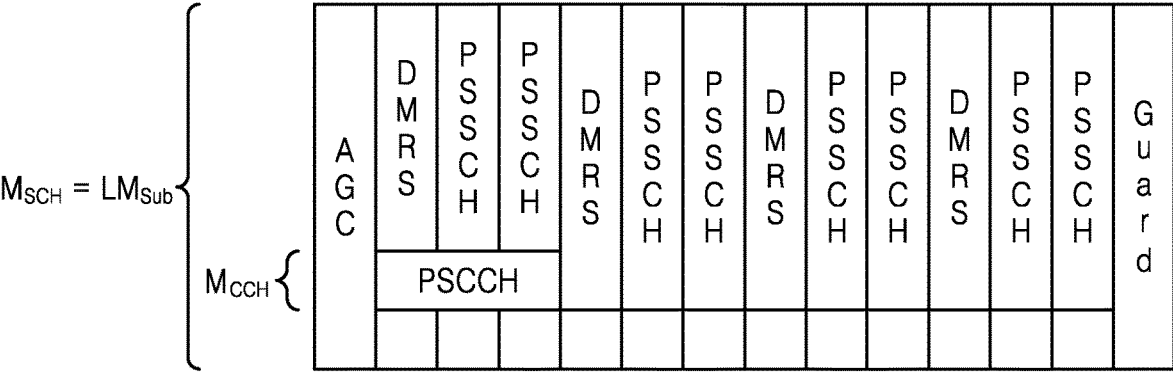

In detail, FIGS. 2A, 2B, and 2D illustrate slots, each including symbols where a PSCCH and a PSSCH exist simultaneously, in the NR SL. FIG. 2C illustrates a case where the PSCCH and the PSSCH are allocated so as not to exist together in the same symbol.

Referring to FIGS. 2A and 2B, in the NR SL, a physical resource block (PRB) length $M_{CCH}$ for a PSCCH may not exceed a sub-channel size $M_{Sub}$. An NR PSSCH may be allocated in L consecutive sub-channels starting from a sub-channel where a PSCCH is allocated. When the sub-channel size $M_{Sub}$ is greater than the PRB length $M_{CCH}$ for the PSCCH, there is always a symbol on which the PSCCH and the PSSCH exist simultaneously. Furthermore, in a case that the PSSCH is allocated in two or more sub-channels (L>2), there is always a symbol on which the PSCCH and the PSSCH exist simultaneously.

Referring to FIG. 2C, the PSCCH may be allocated in all sub-channels. In this case, there may not be a symbol on which the PSCCH and the PSSCH are allocated at the same time. Referring to FIG. 2D, there may be sub-channel where the PSCCH and the PSSCH are not allocated. Even in this case, the PSCCH and the PSSCH may be allocated on the same symbols.

A slot in a SL bandwidth part (BWP) may have different numbers of symbols and is not limited to the above-described embodiment. For example, each slot may have 7 to 14 symbols. As another example, a slot in which a physical SL feedback channel (PSFCH) is transmitted may be three symbols shorter than other slots.

In order for a wireless communication device to receive data in FR2 environment, a beamforming gain is required. In an FR2 environment requiring a beamforming gain, problems may occur when the PSCCH and the PSSCH are transmitted on the same symbols. Hereinafter, problems that may occur in this case are described in detail.

Figure 3A:
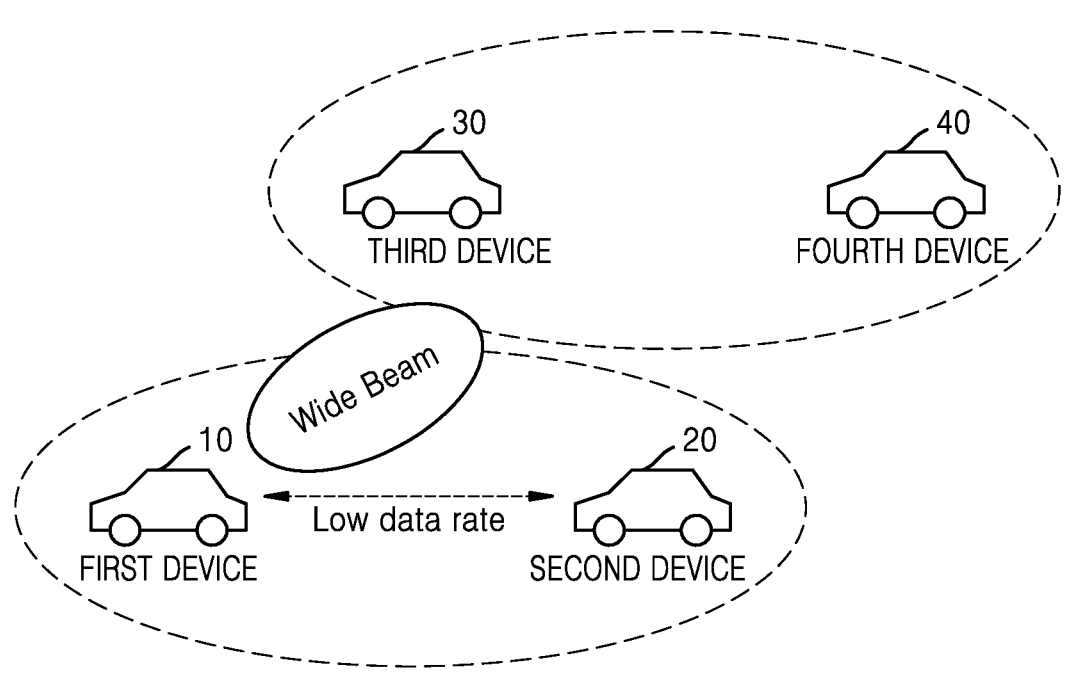
FIGS. 3A and 3B illustrate sidelink communication according to an embodiment.
Figure 3B:
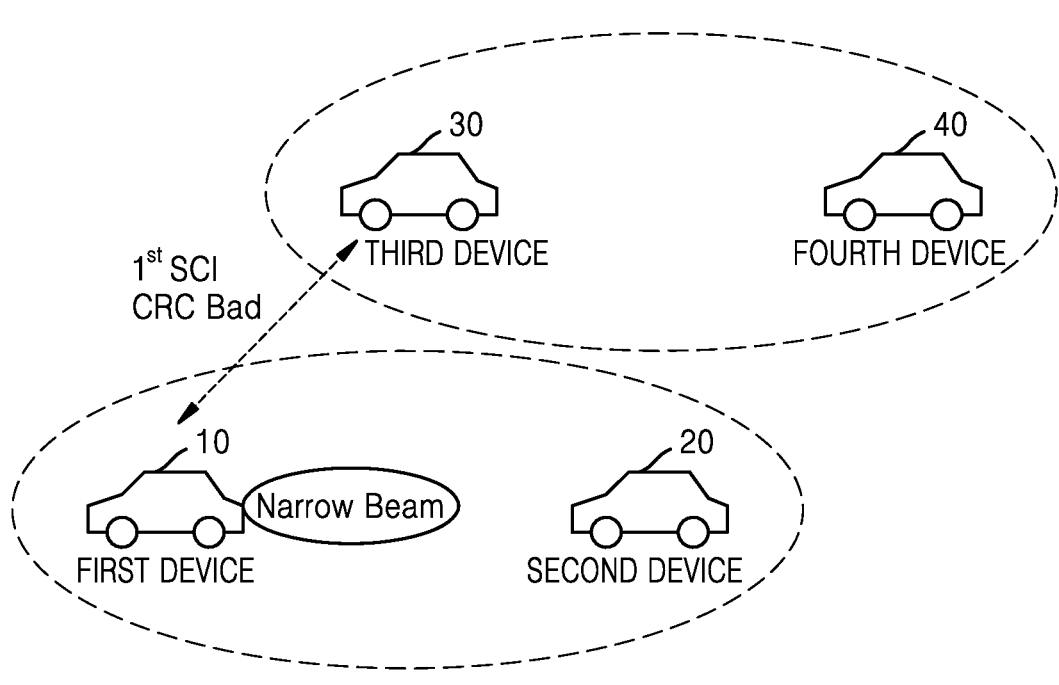

FIGS. 3A and 3B illustrate SL communication according to an embodiment.

In detail, FIG. 3A illustrates a case in which a first device 10 transmits a PSSCH using a wide beam, and FIG. 3B illustrates a case in which the first device 10 transmits a PSSCH using a narrow beam.

Referring to FIG. 3A, the first device 10 may transmit a PSCCH using a wide beam so that a second device 20 and a third device 30 may receive a first SCI. In other words, the first device 10 may transmit the PSCCH using a wide beam so that a plurality of devices may receive the SCI.

When the PSCCH and a PSSCH are allocated on the same symbols, the first device 10 may transmit the PSCCH and the PSSCH to one or more UEs by using a wide beam. For example, in a case that there is a symbol period in which the PSCCH and the PSSCH overlap, the first device 10 may transmit not only the PSCCH but also the PSSCH by using a wide beam. Accordingly, the first device 10 may transmit data using a wide beam. In this case, the second device 20 and the third device 30 may both receive the first SCI, and the second device 20 may also receive the PSSCH. However, the second device 20 may not be able to obtain a beamforming gain for the PSSCH transmitted using the wide beam. Thus, as the second device 20 does not obtain a beamforming gain for the PSSCH, a problem may occur in that data throughput is lowered.

Referring to FIG. 3B, to increase PSSCH data throughput, the first device 10 may transmit a PSSCH to the second device 20 by using a narrow beam. In a case that there is a symbol on which the PSCCH and the PSSCH are simultaneously transmitted, the PSCCH may also be transmitted using the narrow beam, and a particular UE may fail to decode first SCI. For example, when the first device 10 transmits the PSCCH and the PSSCH using the narrow beam, the second device 20 may receive the PSCCH and decode the first SCI successfully, but the third device 30 may fail to receive the PSCCH from the first device 10 and fail to decode the first SCI. Accordingly, when the first device 10 uses the narrow beam to increase the PSSCH data throughput, a problem may occur in that a certain UE fails to decode the first SCI.

Hereinafter, methods proposed by the present disclosure to prevent or reduce these problems are described in detail.

FIG. 4 illustrates channel properties according to a quasi co-location (QCL) type.

Referring to FIG. 4, channel properties corresponding to QCL-T e-A include Doppler shift, Doppler spread, average delay, and delay spread. Channel properties corresponding to QCL-T e-B include Doppler shift and Doppler spread. Channel properties corresponding to QCL-T e-C include Doppler shift and average delay. Channel properties corresponding to QCL-T e-D include a spatial Rx parameter. QCL-T e-D may mean that a wireless communication device shares spatial Rx parameters obtained from a source signal with a target signal. The source signal may be referred to as a source channel. The target signal may be referred to as a target channel.

Hereinafter, a TCI is described. By signaling TCI states, a base station may inform a UE that a physical downlink shared channel (PDSCH) and a physical downlink control channel (PDCCH) are transmitted using the same beam as a reference signal (RS). In other words, the base station may inform the UE that the PDSCH and the PDCCH are transmitted based on the same spatial filter as a specific RS. Each TCI state may include information about a RS. For example, the TCI state may include information about at least one of a synchronization signal block (SSB) and a channel state information-reference signal (CSI-RS). The base station may inform the UE which TCI is associated with the PDSCH and the PDCCH via TCI state signaling.

Hereinafter, a method by which a wireless communication device transmits and receives a PSCCH and a PSSCH based on multiple TCIs in NR SL is proposed.

A PSSCH may have one or a plurality of TCI states. The PSSCH may also have one or a plurality of QCL type-Ds. Accordingly, a wireless communication device may transmit or receive a PSCCH and the PSSCH using one or more TCI states for the PSSCH.

For example, when the PSCCH and a PSSCH are simultaneously transmitted in a first symbol period, the first device (e.g., first device 10 of FIG. 1) may configure the PSSCH to have the same TCI state as the PSCCH. For example, the first device 10 may transmit the PSSCH to the second device (e.g., second device 20 of FIG. 1) or the third device (e.g., third device 30 of FIG. 1) by using a first beam corresponding to the TCI state of the PSCCH. The second device 20 or the third device 30 may obtain a TCI state via SCI included in the PSSCH or PSCCH, and form the first beam in the first symbol period based on the obtained TCI state to simultaneously receive the PSSCH and the PSCCH. In the present disclosure, a symbol period may occur periodically rather than just one time. Furthermore, in the present disclosure, the first symbol period may be a period including symbols on which the PSSCH and the PSCCH are simultaneously transmitted or received, and the second symbol period may be a period including symbols on which only the PSSCH is transmitted or received. However, it may be fully understood that the technical spirit of the present disclosure is not limited thereto.

In the second symbol period, the first device 10 may select one among at least one TCI state of the PSSCH and transmit the PSSCH to the second device 20 or the third device 30 by using a second beam corresponding to the selected TCI state. At this time, the first device 10 may transmit, to the second device 20 or the third device 30, SCI including a TCI state of the PSSCH, which corresponds to the second beam, so that the second device 20 or the third device 30 may form the second beam and receive the PSSCH via the second beam. In this case, the second device 20 or the third device 30 may obtain the TCI state of the PSSCH from the received SCI, form the second beam in the second symbol period, and receive the PSSCH via the second beam.

In some embodiments, the first device 10 may control lengths of the first and second symbol periods. For example, the first device 10 may control the number of symbols on which the PSSCH is transmitted. As another example, the first device 10 may control the number of symbols on which the PSSCH and the PSCCH are simultaneously transmitted and the number of symbols on which the PSSCH and the PSCCH are not simultaneously transmitted.

As another example, when a TCI state related field of the PSSCH is not signaled, the PSCCH and the PSSCH may both have the same TCI state. When the TCI state related field of the PSSCH is not signaled, the wireless communication device may determine that a TCI state of the PSCCH is the same as a TCI state of the PSSCH. As a specific example, if the PSSCH is scheduled by a SCI format without the TCI related field, the wireless communication device may expect that a TCI state or QCL assumption for the PSSCH is identical to a TCI state or QCL assumption whichever is applied for PSCCH transmission within an active SL BWP.

As another example, when the TCI state related field of the PSSCH is signaled, a symbol of the PSCCH and one or more symbols of the PSSCH following the symbol may be transmitted based on the same TCI state. As a specific example, when the TCI state related field of the PSSCH is signaled, the wireless communication device may receive a symbol for the PSCCH and one or more symbols of the PSSCH following it based on the same TCI state.

As another example, the TCI state of the PSSCH and a time point when the TCI state of the PSSCH is changed may be transmitted via signaling of at least one of first SCI, second SCI, and UE capability information. The TCI state of the PSSCH and the time point when the TCI state of the PSSCH is changed may be transmitted via various types of signaling, and are not limited to the above-described embodiment.

The TCI state of the PSSCH and the time point when the TCI state of the PSSCH is changed may be transmitted based on at least one of SCI format 1-A, SCI format 2-A, and SCI format 2-B. PSSCH TCI state information may be referred to as PSSCH_TCI_Info. The PSSCH_TCI_Info may have a size of X bits and include QCL information of a beyond part of the PSSCH in a slot, where X is an integer greater than 0. For example, the PSSCH_TCI_Info may include QCL information of the PSSCH transmitted using the narrow beam. Furthermore, the PSSCH_TCI_Info may include QCL information of a PSSCH whose TCI state is changed differently from the TCI state of the first transmitted PSSCH. The time point when the TCI state of the PSSCH is changed may be defined by PSSCH_TCI_TDM_Info. The PSSCH_TCI_TDM_Info may have a size of Y bits and divide the PSSCH into a front part and a beyond part. A starting symbol of the beyond part of the PSSCH may be defined as $$s_{CCH}^{end} + \text{PSSCH\_TCI\_TDM\_Info} + 1 \text{ symbol. } s_{CCH}^{end}$$

may indicate a last symbol of the front part of the PSCCH. PSSCH_TCI_TDM_Info may indicate the number of PSSCH symbols that come after $$s_{CCH}^{end}.$$

If the PSSCH is scheduled by a SCI format having the TCI related field, the wireless communication device shall use a TCI state according to a value of a 'TCI' field in the detected PSCCH with SCI for determining PSSCH antenna port QCL. The wireless communication device may assume that from a first symbol of the PSSCH to the $$s_{CCH}^{end} + \text{PSSCH\_TCI\_TDM\_Info symbol,}$$

the TCI state or the QCL assumption for the PSSCH is identical to the TCI state or QCL assumption whichever is applied for the PSCCH transmission within the active SL BWP. The wireless communication device may assume that from the $$s_{CCH}^{end} + \text{PSSCH\_TCI\_TDM\_Info} + 1$$

symbol to a last symbol of the PSSCH, the PSSCH are quasi co-located with the RSs in the TCI state with respect to the QCL type parameters given by the indicated TCI state.

The wireless communication device may receive the first SCI including the TCI state of the PSSCH and the time point when the TCI state of the PSSCH is changed, and adjust receive beamforming based on the received first SCI. The wireless communication device may receive signaling related to the TCI state of the PSSCH, and perform at least one of hybrid beamforming and channel estimation based on the signaling.

Figure 5:
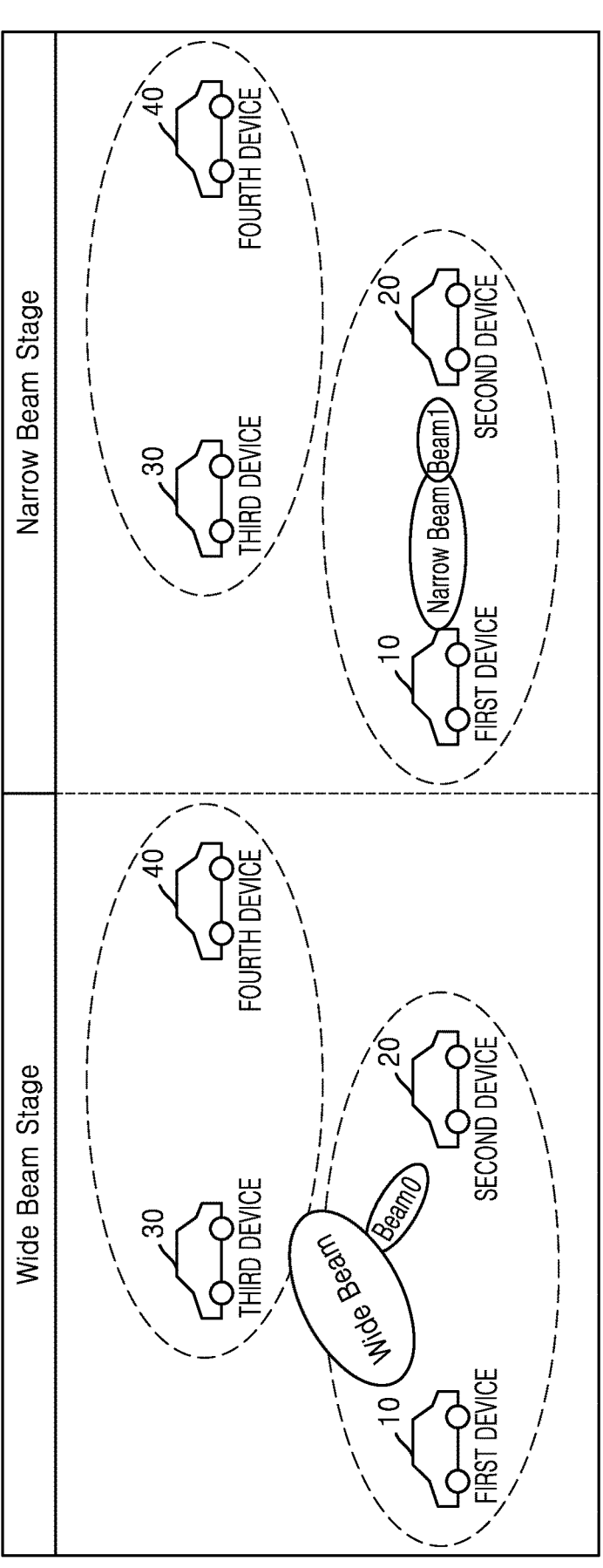
FIG. 5 illustrates sidelink communication based on multiple transmission configuration indications (TCIs), according to an embodiment.

FIG. 5 illustrates SL communication based on multiple TCIs, according to an embodiment.

The left side of FIG. 5 shows a wide beam stage. The right side of FIG. 5 shows a narrow beam stage. A PSSCH may have a plurality of TCI states.

Referring to FIG. 5, a wireless communication device may transmit symbols in a wide beam stage to a plurality of wireless communication devices by using a wide beam. For example, a first device 10 may transmit symbols to a second device 20 and a third device 30 by using a wide beam.

The wireless communication device may transmit symbols in a narrow beam stage to a particular wireless communication device by using a narrow beam. For example, the first device 10 may transmit symbols of a second symbol period to the second device 20 by using a narrow beam.

The wide beam stage may include a symbol on which a PSCCH and the PSSCH overlap. The narrow beam stage may include a symbol on which the PSSCH is transmitted. The narrow beam stage may immediately follow an end of the wide beam stage. A TCI state corresponding to the wide beam may be different from a TCI state corresponding to the narrow beam.

Figure 6:
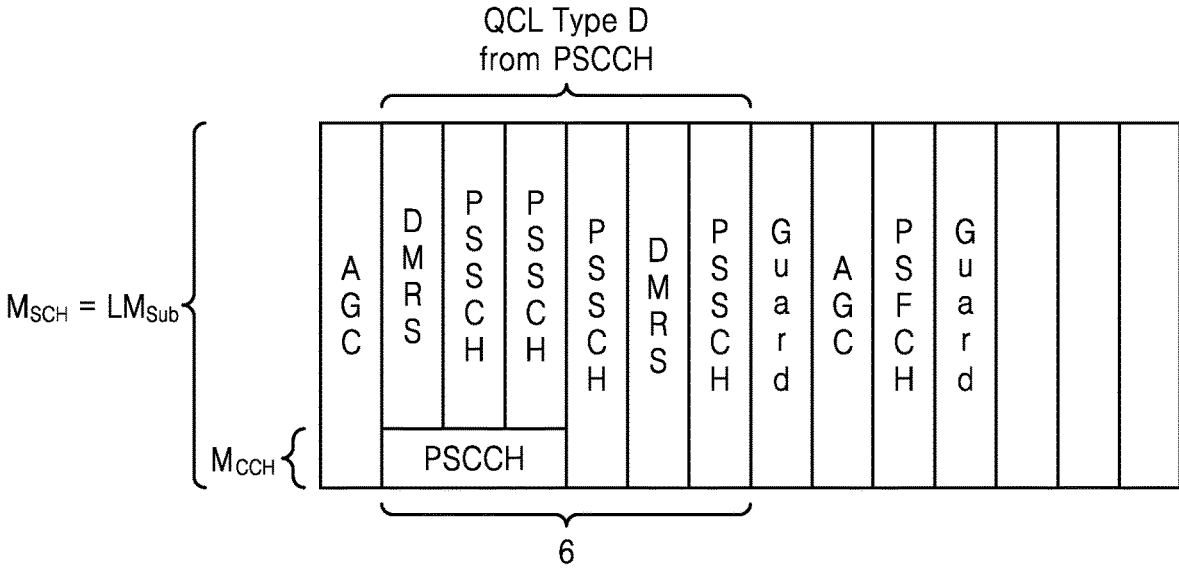
FIG. 6 illustrates a TCI state of a physical sidelink shared channel (PSSCH) according to an embodiment.

FIG. 6 illustrates a TCI state of a PSSCH according to an embodiment.

When a length of symbols on which the PSSCH is transmitted is less than α, a wireless communication device may determine that a TCI state of a PSCCH is the same as the TCI state of the PSSCH. α is an integer greater than or equal to 2. Referring to FIG. 6, when the length of symbols on which the PSSCH is transmitted is less than 7 (when α=7), the wireless communication device may determine that the PSCCH and the PSSCH both have the same TCI state regardless of the indicated TCI state. In detail, because the length of PSSCH symbols of FIG. 6 is 6, the wireless communication device configured with α=7 may determine that the TCI state of the PSCCH is the same as the TCI state of the PSSCH when receiving the PSSCH symbols as shown in FIG. 6. Alternatively or additionally, the wireless communication device may receive the PSSCH based on the TCI state of the PSSCH.

Referring to FIG. 6, a PSSCH symbol length may include adjacent DMRS symbols. The length of the symbols on which the PSSCH is transmitted may be determined based on at least one of a slot length for a BWP, PRB lengths for the PSCCH and the PSSCH, and a symbol length for a PSFCH. When the length of the PSSCH symbols is less than α, the wireless communication device may determine that a timing for a TCI state change is insufficient. Alternatively or additionally, the wireless communication device may assume that the PSCCH and the PSSCH both have the same TCI state.

Figure 7:
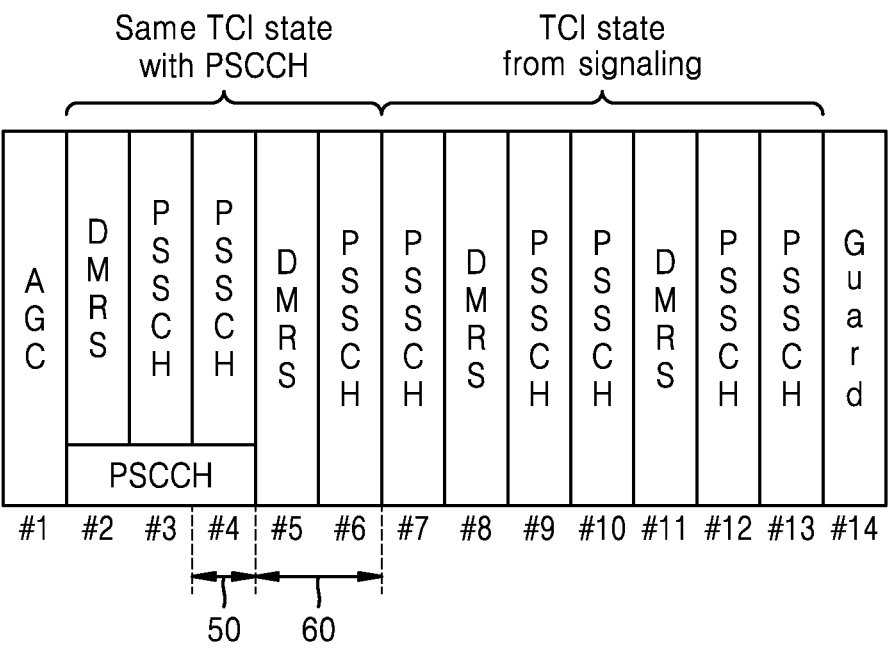
FIG. 7 is a diagram for explaining an operation method of a device, according to an embodiment.

FIG. 7 is a diagram for explaining an operation method of a device, according to an embodiment;

In detail, FIG. 7 shows a TCI state of a PSSCH and a time point at which a TCI state change is triggered when a TCI state related field of the PSSCH is signaled. When the TCI state related field of the PSSCH is signaled, the PSSCH may be transmitted or received based on the same TCI state as a PSCCH from a last symbol 50 (e.g., #4) on which the PSCCH is transmitted or received to at least one symbol, i.e., n symbols 60 (e.g., #5 and #6). Symbols from an n+1-th symbol after the last symbol 50 of the PSCCH to a last symbol of the PSSCH may be transmitted based on a signaled TCI state. The first device 10 may variably set a value of n. In the 3rd Generation Partnership Project (3GPP) standard, the value of n may be fixed to an arbitrary value. The fixed value of n may be applied to all UEs. n may have a plurality of candidate sets specified by the standard. UE capability information may include information about the candidate sets specified by the standard. The TCI state of the PSSCH and n may be included in at least one of a radio resource control (RRC) signal, first SCI, and second SCI. The second device 20 may receive the TCI state of the PSSCH and n via signaling.

Figure 8A:
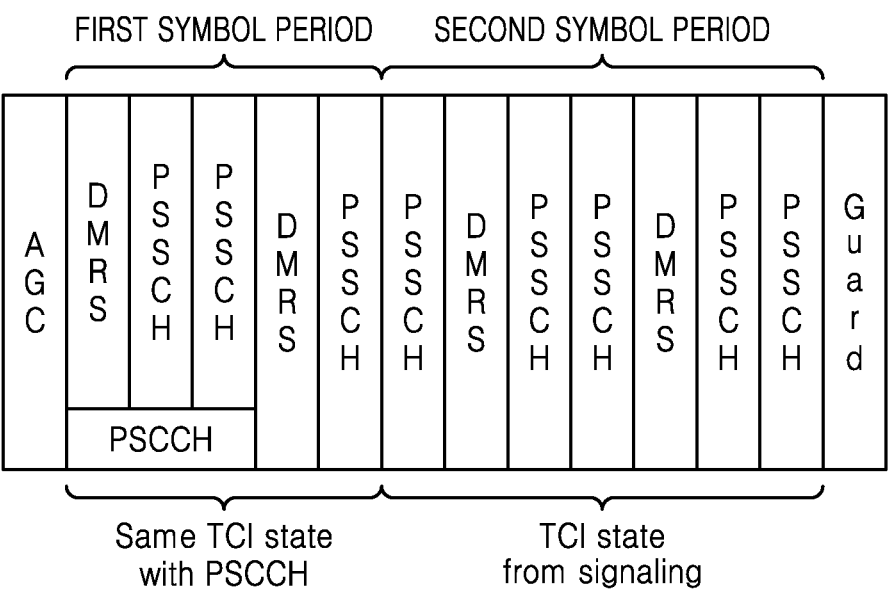
FIGS. 8A and 8B illustrate symbols transmitted by a wireless communication device, according to embodiments.
Figure 8B:
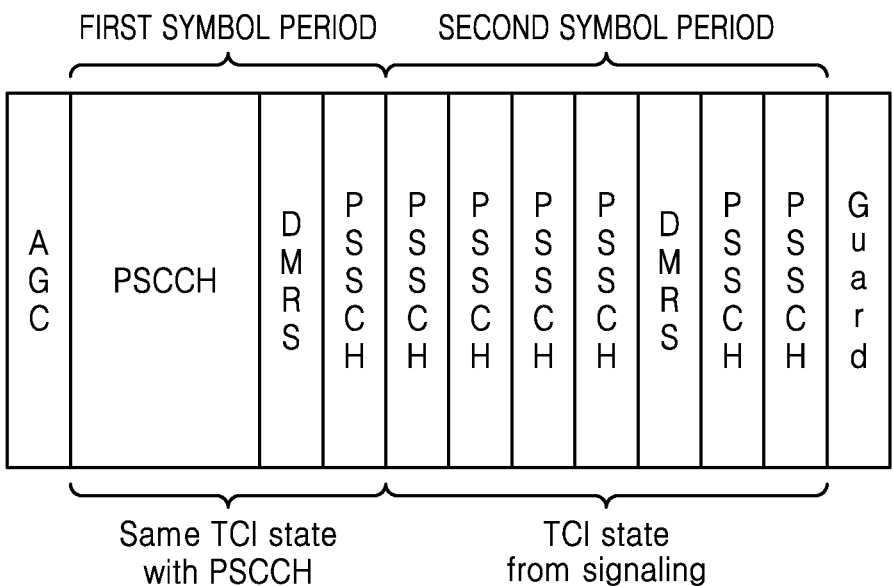

FIGS. 8A and 8B illustrate symbols transmitted by a wireless communication device, according to embodiments.

In SL communication, the first device (e.g., the first device 10 of FIG. 1) may transmit symbols of a first symbol period to one or more UEs by using a wide beam. Referring to FIG. 8A, the first symbol period may include at least one symbol on which a PSCCH and a PSSCH overlap. For symbols on which the PSCCH and the PSSCH overlap, a TCI state of the PSSCH may be the same as a TCI state of the PSCCH. For example, the second device (e.g., the second device 20 of FIG. 1) may receive, from the first device 10, symbols of the first symbol period including at least one symbol on which the PSCCH and the PSSCH overlap, and determine that the TCI state of the PSSCH is the same as the TCI state of the PSCCH in a period in which the PSCCH and the PSSCH overlap. Alternatively or additionally, the second device 20 may determine that the TCI state of the PSSCH in the first symbol period is the same as the TCI state of the PSCCH. Because the PSCCH in the first symbol period is transmitted using the wide beam, a plurality of UEs may decode first SCI. Referring to FIG. 8B, the first symbol period may include a PSCCH and a PSSCH. In the first symbol period, a TCI state of the PSSCH may be the same as that of the PSCCH. For example, the second device 20 may receive, from the first device 10, the PSCCH and the PSSCH in the first symbol period, and determine that the TCI state of the PSSCH is the same as that of the PSCCH.

When the first device 10 signals information related to the TCI state of the PSSCH to the second device 20, the TCI state of the PSSCH in a second symbol period may be different from the TCI state of the PSCCH in the first symbol period. For example, when the first device 10 transmits information related to the TCI state of the PSSCH to the second device 20 based on at least one of first SCI, second SCI, and RRC, the second device 20 may determine that the TCI state of the PSSCH in the second symbol period is different from the TCI state of the PSCCH in the first symbol period. The information related to the TCI state of the PSSCH may include QCL information of the PSSCH in the second symbol period, information about a last symbol on which the PSCCH is transmitted, and information about the number of symbols in the first symbol period that come after the last symbol. When the first device 10 signals the information related to the TCI state of the PSSCH to the second device 20, the first device 10 may transmit, based on the signaled TCI state of the PSSCH, symbols of the second symbol period to the second device 20 by using a narrow beam. The second device 20 may receive the PSSCH from the first device 10 based on the signaled TCI state. Because the PSSCH is transmitted using the narrow beam, data throughput may be increased.

When the first device 10 does not signal the information related to the TCI state of the PSSCH to the second device 20, the TCI state of the PSSCH in the second symbol period may be the same as the TCI state of the PSCCH in the first symbol period. For example, when the second device 20 does not receive information related to the TCI state of the PSSCH, the second device 20 may determine that the TCI state of the PSSCH is the same as the TCI state of the PSCCH.

When a length of the PSSCH symbols is less than a particular symbol length, the second device 20 may always receive the PSSCH based on the TCI state of the PSCCH. For example, when the length of PSSCH symbols is less than 7, the second device 20 may determine that the TCI state of the PSSCH is the same as the TCI state of the PSCCH across all symbol periods. Therefore, when the length of PSSCH symbols received by the second device 20 is 6, the PSSCH may be received based on the TCI state of the PSCCH regardless of whether the TCI state of the PSSCH is signaled.

Figure 9:
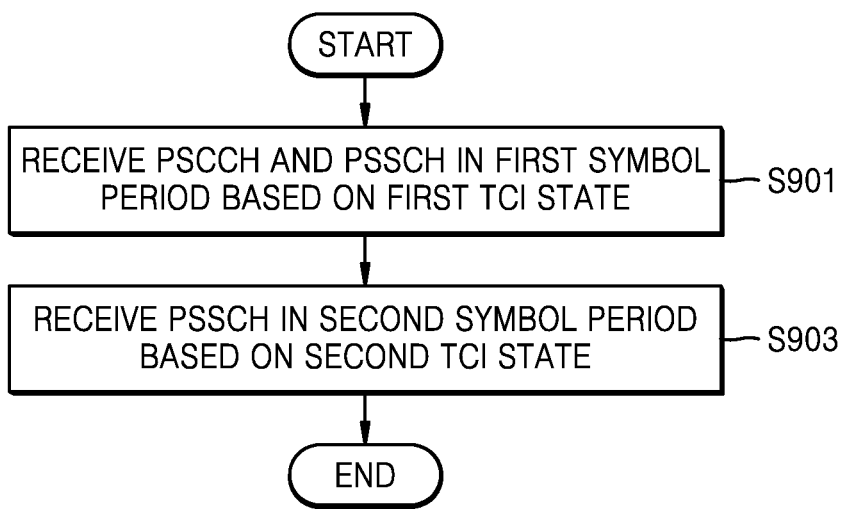
FIG. 9 illustrates an operation method of a second device, according to an embodiment.

FIG. 9 illustrates an operation method of a second device, according to an embodiment.

In operation S901, the second device (e.g., the second device 20 of FIG. 1) may receive a PSCCH and a PSSCH from the first device (e.g., the first device 10 of FIG. 1) in a first symbol period based on a first TCI state. For example, the second device 20 may receive, in the first symbol period including symbols on which the PSCCH and the PSSCH are received, the PSCCH and the PSSCH from the first device 10 based on the first TCI state assigned to the PSCCH. The second device 20 may receive the PSCCH and the PSSCH simultaneously or receive them separately on different symbols.

For example, the second device 20 may receive the PSCCH and the PSSCH on the same symbols, and determine that a TCI state of the PSSCH is the same as the first TCI state of the PSCCH on the symbols on which the PSCCH and the PSSCH are simultaneously received. In this case, the second device 20 may determine that the TCI state of the PSSCH that is not received simultaneously with the PSCCH in the first symbol period is the same as the first TCI state of the PSCCH.

As another example, the second device 20 may receive the PSCCH and the PSSCH on different symbols of the first symbol period, and determine that the TCI state of the PSSCH is the same as the first TCI state of the PSCCH.

In operation S903, the second device 20 may receive the PSSCH in a second symbol period based on a second TCI state. For example, the second device 20 may receive the PSSCH from the first device 10 based on the second TCI state in the second symbol period that follows the first symbol period and includes symbols on which the PSSCH is received. The second device 20 may obtain information indicating the second TCI state from one of the PSCCH and the PSSCH received in the first symbol period, and configure the second TCI state based on the information indicating the second TCI state. The second TCI state may be different from the first TCI state.

A beam corresponding to the first TCI state may be wider than a beam corresponding to the second TCI state. For example, a first beam formed by the second device 20 according to the first TCI state may be wider than a second beam formed by the second device 20 according to the second TCI state. Accordingly, the second device 20 may increase the PSSCH throughput based on the second TCI state.

The PSCCH may include SCI indicating at least one of the first TCI state and the second TCI state. Alternatively or additionally, the PSCCH may include SCI indicating a starting symbol of the second symbol period. The SCI indicating the starting symbol of the second symbol period may include information about a last symbol of the PSCCH and information about the number of one or more PSSCH symbols in the first symbol period that come after the last symbol. For example, as described above with reference to FIGS. 1 through 8B, the PSCCH may include information related to the TCI state of the PSSCH.

Like the PSCCH, the PSSCH may include SCI indicating at least one of the first TCI state and the second TCI state. For example, the information related to the TCI state of the PSSCH may be transmitted via signaling of at least one of the first SCI and the second SCI. TCI state information of the PSSCH may be transmitted via various types of signaling including RRC, UE capability information, etc., and is not limited to the above-described embodiment.

When the second device 20 receives signaling of the second TCI state for the PSSCH in the second symbol period, the second device 20 may determine that the first TCI state of the PSCCH is different from the second TCI state of the PSSCH in the second symbol period.

When the second device 20 does not receive information related to the second TCI state in at least one of the first and second symbol periods, the first TCI state may be the same as the second TCI state. For example, when the second device 20 does not receive information related to the TCI state of the PSSCH, the second device 20 may determine that the TCI state of the PSSCH in the first symbol period and the second TCI state of the PSSCH in the second symbol period are both the same as the first TCI state of the PSCCH. When the second device 20 does not receive the information related to the second TCI state, the second device 20 may configure the second TCI state to be the same as the first TCI state.

The second device 20 may receive information related to a that is an integer greater than or equal to 2 from the first device 10. When a symbol length of the PSSCH received by the second device 20 is less than $\alpha$, the first TCI state may be the same as the second TCI state. For example, when the symbol length of the PSSCH received by the second device 20 is less than $\alpha$, the second device 20 may determine that the first TCI state of the PSCCH in the first symbol period and the TCI state of the PSSCH in the first symbol period are both the same as the second TCI state of the PSSCH in the second symbol period. In other words, a wireless communication device may receive the PSSCH in a slot based on one TCI state of the PSCCH and may not change the TCI state. As described above with reference to FIG. 6, $\alpha$ may be determined by a transmitter UE or specified by the standard. In other words, when a total length of the first and second symbol periods is less than or equal to a threshold value, the second device 20 may configure the second TCI state to be the same as the first TCI state. Furthermore, when the total length of the first and second symbol periods exceeds the threshold value, the second device 20 may configure the second TCI state to match information provided from the first device 10.

The second device 20 may perform at least one of hybrid beamforming and channel estimation by using information about the second TCI state of the PSSCH.

Figure 10:
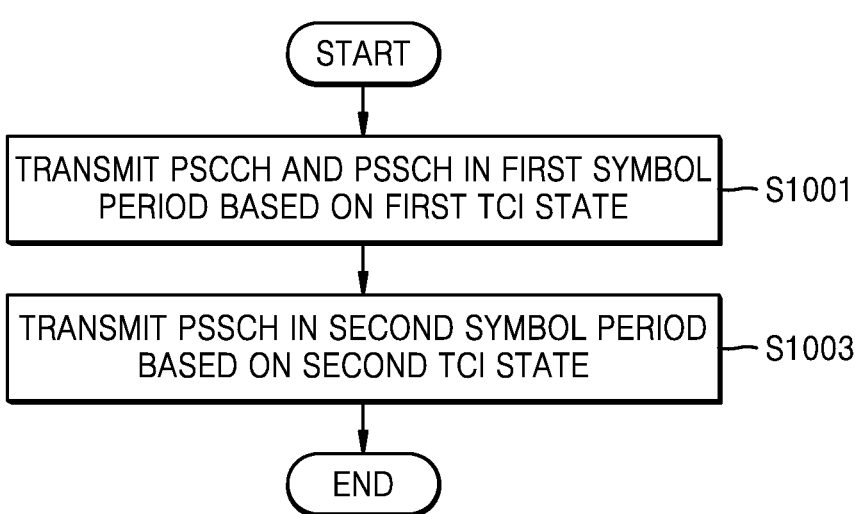
FIG. 10 illustrates an operation method of a first device, according to an embodiment.

FIG. 10 illustrates an operation method of a first device, according to an embodiment.

In operation S1001, the first device 10 may transmit a PSCCH and a PSSCH to the second device 20 in a first symbol period based on a first TCI state. For example, the first device 10 may transmit, to the second device 20, the PSCCH and the PSSCH based on the first TCI state of the PSCCH in the first symbol period including a period in which the PSCCH and the PSSCH overlap. The first TCI state of the PSCCH may be the same as a TCI state of the PSSCH that overlaps with the PSCCH.

In operation S1003, the first device 10 may transmit the PSSCH to the second device 20 based on a second TCI state. For example, the first device 10 may transmit the PSSCH to the second device 20 based on the second TCI state in a second symbol period following the first symbol period.

When the first device 10 does not transmit information related to the second TCI state of the PSSCH, the first TCI state may be the same as the second TCI state.

The first device 10 may transmit information related to $\alpha$ that is an integer greater than or equal to 2 to the second device 20. When a symbol length of the PSSCH transmitted by the first device 10 is less than $\alpha$, the first TCI state of the PSCCH may be the same as the second TCI state of the PSSCH.

The PSCCH may include SCI indicating at least one of the first TCI state of the PSCCH and the second TCI state of the PSSCH. Alternatively or additionally, the PSCCH may include SCI indicating a starting symbol of the second symbol period. When the PSCCH includes TCI state signaling information for the PSSCH in the second symbol period, the first TCI state of the PSCCH may be different from the second TCI state of the PSSCH in the second symbol period.

When the PSCCH and the PSSCH are simultaneously transmitted, the first symbol period may include one or more symbols following a symbol on which the PSCCH and the PSSCH overlap. SCI indicating a starting symbol of the second symbol period may include information about a last symbol of the PSCCH and information about the number of one or more PSSCH symbols following the last symbol.

The PSSCH may include SCI indicating at least one of the first TCI state of the PSCCH and the second TCI state of the PSSCH in the second symbol period.

A beam corresponding to the first TCI state of the PSCCH may be wider than a beam corresponding to the second TCI state of the PSSCH. For example, a first beam formed by the first device 10 according to the first TCI state may be wider than a second beam formed by the first device 10 according to the second TCI state. Accordingly, the first device 10 may increase the PSSCH throughput based on the second TCI state.

Figure 11:
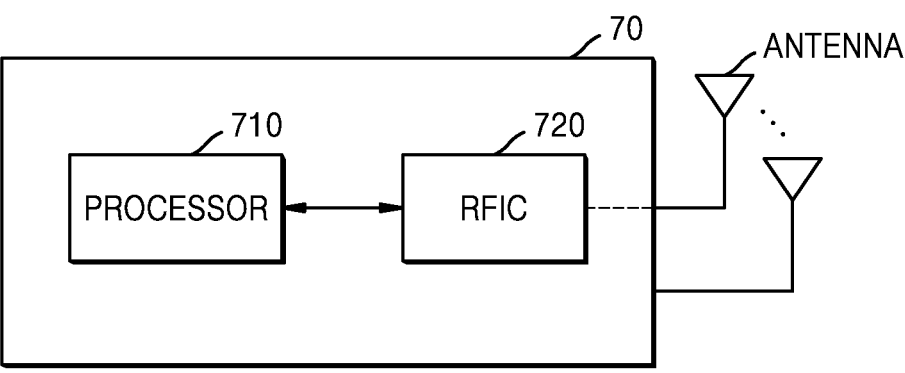
FIG. 11 is a block diagram of a second device according to an embodiment.

FIG. 11 is a block diagram of a wireless communication device according to an embodiment.

Referring to FIG. 11, a wireless communication device 70 may include one or more processors 710 and one or more radio frequency integrated circuits (RFICs) 720. The processor 710 may control the RFIC 720 and may be configured to implement an operation method of the wireless communication device 70 and operation flowcharts according to the present disclosure. The wireless communication device 70 may include a plurality of antennas, and the RFIC 720 may transmit or receive wireless signals through one or more of the antennas. At least some of the antennas may correspond to a transmitting antenna. The transmitting antenna may transmit a radio signal to an external device (e.g., another UE or a base station) other than the wireless communication device 70. At least some of the remaining antennas may correspond to a receiving antenna. The receiving antenna may receive a radio signal from the external device.

For example, the RFIC 720 may receive a PSCCH and a PSSCH from the first device 10 based on a first TCI state of the PSCCH in a first symbol period including a period in which the PSCCH and the PSSCH overlap. The processor 710 may determine that the first TCI state of the PSCCH is the same as a TCI state of the PSSCH in the first symbol period. The RFIC 720 may receive the PSSCH from the first device 10 based on a second TCI state in a second symbol period following the first symbol period.

FIG. 12 is a block diagram of an electronic device according to an embodiment. Referring to FIG. 12, an electronic device 1000 may include a memory 1010, a processor unit 1020, an input/output (I/O) controller 1040, a display 1050, an input device 1060, and a communication processor 1090. In this case, the memory 1010 may be configured as a plurality of memories. Configurations and functions of the components are now described.

The memory 1010 may include a program storage 1011 for storing programs for controlling an operation of the electronic device 1000 and a data storage 1012 for storing data generated during program execution. The data storage 1012 may store data necessary for operations of an application program 1013 and a TCI state determination program 1014. The program storage 1011 may include the application program 1013 and the TCI state determination program 1014. Here, the programs included in the program storage 1011 may be sets of instructions and may be expressed as instruction sets.

The application program 1013 may include an application program that operates in the electronic device 1000. In other words, the application program 1013 may include instructions for an application run by a processor 1022. The TCI state determination program 1014 may determine TCI states of a PSCCH and a PSSCH according to embodiments.

A peripheral device interface 1023 may control a connection of I/O peripheral devices of a base station to the processor 1022 and a memory interface 1021. The processor 1022 may control the base station to provide services by using at least one software program. In this case, the processor 1022 may execute at least one program stored in the memory 1010 to provide a service corresponding to the program.

The I/O controller 1040 may provide an interface between I/O devices, such as the display 1050 and the input device 1060, and the peripheral device interface 1023. The display 1050 may display state information, input characters, moving pictures, still pictures, etc. For example, the display 1050 may display information about an application program executed by the processor 1022.

The input device 1060 may provide input data generated due to a selection by the electronic device 1000 to the processor unit 1020 via the I/O controller 1040. In this case, the input device 1060 may include a keypad including at least one hardware button, a touch pad for sensing touch information, etc. For example, the input device 1060 may provide the processor 1022 with the touch information, such as a touch, a touch movement, and a touch release that have been sensed by the touch pad, via the I/O controller 1040. The electronic device 1000 may include the communication processor 1090 that performs communication functions for voice communication and data communication.

Embodiments have been set forth above in the drawings and the specification. Although embodiments have been described using specific terms in the present specification, these are used only for the purpose of explaining the technical spirit of the present disclosure, and are not used to limit the meaning or the scope of the present disclosure set forth in the claims.

While the present disclosure has been particularly shown and described with reference to embodiments thereof, it will be understood that various changes in form and details may be made therein without departing from the spirit and scope of the following claims.

What is claimed is:

1. An operation method of a second device for performing sidelink-based vehicle to everything (V2X) communication with a first device, the operation method comprising:

receiving, by the second device from the first device during a first symbol period included in a slot, a physical sidelink control channel (PSCCH) and a first physical sidelink shared channel (PSSCH), based on a first transmission configuration indication (TCI) state assigned to the PSCCH, the first symbol period comprising first symbols on which the PSCCH and the first PSSCH are received;

configuring a second TCI state based on whether a total length of the first symbol period and a second symbol period exceeds a threshold value, wherein the second TCI state is configured to match the first TCI state based on the total length being less than or equal to the threshold value, and wherein the second TCI state is determined to match information provided from the first device based on the total length exceeding the threshold value; and receiving, by the second device from the first device during the second symbol period that follows the first symbol period and is included in the slot, a second PSSCH, based on the second TCI state, the second symbol period comprising second symbols on which the second PSSCH is received.

2. The operation method of claim 1, wherein the receiving, during the second symbol period, of the second PSSCH comprises:

obtaining information indicating the second TCI state from at least one of the PSCCH and the first PSSCH received during the first symbol period; and configuring the second device according to the second TCI state based on the information indicating the second TCI state.

3. The operation method of claim 2, wherein the second TCI state is one of a plurality of TCI states assigned to the first PSSCH.

4. The operation method of claim 1, wherein a first beam formed by the second device according to the first TCI state is wider than a second beam formed by the second device according to the second TCI state.

5. The operation method of claim 1, wherein the receiving, during the second symbol period, of the second PSSCH comprises, when the second device does not receive information related to the second TCI state from the first device, configuring the second TCI state to match the first TCI state.

6. The operation method of claim 1, wherein the PSCCH comprises sidelink control information (SCI) indicating at least one of the first TCI state and the second TCI state.

7. The operation method of claim 6, wherein the SCI further indicates a starting symbol of the second symbol period, and the first TCI state is different from the second TCI state.

8. The operation method of claim 7, wherein the SCI comprises information about a last symbol on which the PSCCH is received and information about a number of at least one symbol following the last symbol.

9. The operation method of claim 1, wherein the first PSSCH received during the first symbol period comprises sidelink control information (SCI) indicating at least one of the first TCI state and the second TCI state.

10. An operation method of a first device for performing sidelink-based vehicle to everything (V2X) communication with a second device, the operation method comprising:

transmitting, by the first device to the second device during a first symbol period included in a slot, a physical sidelink control channel (PSCCH) and a first physical sidelink shared channel (PSSCH), based on a first transmission configuration indication (TCI) state assigned to the PSCCH, the first symbol period comprising first symbols on which the PSCCH and the first PSSCH are transmitted; and transmitting, by the first device to the second device during a second symbol period that follows the first symbol period and is included in the slot, a second PSSCH, based on a second TCI state, the second symbol period comprising second symbols on which the second PSSCH is transmitted, the second TCI state being configured based on whether a total length of the first symbol period and the second symbol period exceeds a threshold value, the second TCI state being configured to match the first TCI state based on the total length being less than or equal to the threshold value, the second TCI state being configured to match information provided from the first device based on the total length exceeding the threshold value.

11. The operation method of claim 10, wherein a first beam formed by the second device according to the first TCI state is wider than a second beam formed by the second device according to the second TCI state.

12. The operation method of claim 10, wherein the second TCI state is one of a plurality of TCI states assigned to the first PSSCH.

13. The operation method of claim 10, wherein the PSCCH comprises sidelink control information (SCI) indicating at least one of the first TCI state and the second TCI state.

14. The operation method of claim 13, wherein the SCI further indicates a starting symbol of the second symbol period, and the first TCI state is different from the second TCI state.

15. The operation method of claim 14, wherein the SCI comprises information about a last symbol on which the PSCCH is transmitted and information about a number of at least one symbol following the last symbol.

16. The operation method of claim 10, wherein the first PSSCH comprises sidelink control information (SCI) indicating at least one of the first TCI state and the second TCI state.

17. A second device for performing sidelink-based vehicle to everything (V2X) communication with a first device, the second device comprising:

a radio frequency integration circuit (RFIC) configured to receive, from the first device during a first symbol period included in a slot, a physical sidelink control channel (PSCCH) and a first physical sidelink shared channel (PSSCH), based on a first transmission configuration indication (TCI) state assigned to the PSCCH, the first symbol period comprising first symbols on which the PSCCH and the first PSSCH are received; and a processor communicatively coupled to the RFIC and configured to determine that the first TCI state assigned to the PSCCH matches a TCI state of the PSSCH in the first symbol period, and to configure a second TCI state based on whether a total length of the first symbol period and a second symbol period exceeds a threshold value, wherein the second TCI state is configured to match the first TCI state based on the total length being less than or equal to the threshold value, and wherein the second TCI state is determined to match information provided from the first device based on the total length exceeding the threshold value, wherein the RFIC is further configured to receive, from the first device during the second symbol period that follows the first symbol period and is included in the slot, a second PSSCH based on the second TCI state, the second symbol period comprising symbols on which the second PSSCH is received.

* * * * *